United States Patent [19]

Anderson

[11] Patent Number: 5,174,621
[45] Date of Patent: Dec. 29, 1992

[54] ADD-ON WRAP-AROUND DASHBOARD

[76] Inventor: John W. Anderson, 2315 SW. 350th Pl., Federal Way, Wash. 98023

[21] Appl. No.: 776,814

[22] Filed: Oct. 15, 1991

[51] Int. Cl.$^5$ ............................................. B60K 37/02
[52] U.S. Cl. ........................................ 296/70; 296/72; 180/90; D12/192; 200/296; 340/461; 340/815.12; 340/815.14; 248/27.1
[58] Field of Search .................. 296/70, 72, 73, 74; 180/90; D12/192; 340/815.12, 815.14, 461; 200/296; 248/27.1, 27.3, 904

[56] References Cited

U.S. PATENT DOCUMENTS

| | | | |
|---|---|---|---|
| D. 202,262 | 9/1965 | Brunger et al. | D12/192 |
| D. 294,140 | 2/1988 | Koch | D12/192 |
| 1,145,698 | 7/1915 | Ohlson | 180/90 X |
| 1,407,751 | 2/1922 | Jeffers | 248/27.1 X |
| 1,639,598 | 8/1927 | Edelmann | 248/27.3 |
| 3,194,338 | 7/1965 | Rutman et al. | 180/90 |
| 3,269,210 | 8/1966 | Steele, Jr. et al. | 74/492 |
| 3,590,136 | 6/1971 | Kinishi et al. | 174/50 |
| 4,025,896 | 5/1977 | Hintze et al. | 340/461 X |
| 4,194,585 | 3/1980 | Prince | 180/90 |
| 4,392,539 | 7/1983 | Fujii et al. | 180/90 |
| 4,447,860 | 5/1984 | Stone et al. | 362/30 |
| 4,724,918 | 2/1988 | Raineri | 180/90 |
| 4,846,382 | 7/1989 | Foultner et al. | 224/42.42 |

FOREIGN PATENT DOCUMENTS 1209178 8/1986 Canada .

OTHER PUBLICATIONS

Brochure: Mack Trucks CH600 Series, 1B-CH-Nov. 1989.
Brochure: WhiteGMC Aero Series—Exclusive Air Management; Volvo GM Heavy Truck Corporation 1989, V009-001A.
Brochure: International from Navistar, 8000 Series Tractors; AD-42547U.
Brochure: International from Navistar, 9000 Series Conventionals; AD-42548V.
J. C. Whitney & Co, Catalog 523R, Oct. 1990, p. 214, "Fiberglass Dash & Console".

*Primary Examiner*—Dennis H. Pedder
*Attorney, Agent, or Firm*—Bruce A. Kaser

[57] ABSTRACT

The invention disclosed here is a dashboard accessory item in the form of an add-on housing that enables the repositioning of certain instrument panels closer to the driver, thereby making the instruments on such panels more accessible. In use, the instrument panels are first detached from a stock dashboard, and the housing is mounted to the dashboard over the location where the panels were originally located. The add-on housing projects forwardly of the dashboard, and the panels are remounted to its forward or frontal face. Such face angles toward the driver as it extends along the dashboard from the steering wheel toward the right-hand side of the cab. This repositions the panels much closer to the driver than they were when originally mounted to the stock dashboard.

9 Claims, 7 Drawing Sheets

ADD-ON WRAP-AROUND DASHBOARD

DESCRIPTION

1. Technical Field

The invention disclosed here generally relates to instrument panels for vehicles, and more particularly, to dashboard housings or casings for mounting instruments such as gauges and switches to a vehicle dashboard.

2. Background Art

The dashboards of most older semi-tractor cabs, and many of the dashboards in current truck models, are generally designed so that they more or less extend straight across the cab. On this kind of dashboard, instruments that are located toward the center or right-hand side of the cab can be difficult to reach by the driver, at least in comparison to those which are positioned directly in front of or about the steering column. In some cases, the driver must actually lean over toward the right in order to better see a particular gauge or activate a switch. Not only does this inconvenience the driver in the physical sense, but it also creates a potential safety problem in that it tends to distract the driver's attention from the road.

In order to make dashboard instruments more accessible, some truck manufacturers have customized their dashboard designs so that they have a portion that curves and at least partially wraps around the driver. The curving portion projects more forwardly into the cab, and consequently, instruments located on such portion are easier to reach, because they are physically placed closer to the driver.

Wrap-around dashboards of the above-described type are typically made as a single modular unit that is installed in the cab at the time the truck is manufactured. However, since this is a relatively recent design, many trucks currently in use, have dashboards that extend straight across the cab. Consequently, there is a need to develop devices or accessories that can modify the contour of dashboards or such trucks, so that they too will have the same advantages and conveniences of the wrap-around design. The invention disclosed here is a device of this type, or in other words, it is a dashboard accessory that functions to reposition at least some instrument panels in a stock dashboard so that they are better located with respect to the normal sitting position of the driver.

Add-on instrument panels that are mountable to a dashboard or other cab areas are known. This is clearly illustrated by the various disclosures set forth in U.S. Pat. Nos. 4,846,382; 4,392,539; 4,194,585; 3,590,136; 3,194,338; and 3,269,210. However, the common practice is to mount an accessory housing to the dashboard where the housing itself functions to add additional gauges, switches or other items that were not formerly present on the stock dashboard, i.e. stereo components, radar, etc.

The present invention departs from these past designs in that its purpose is not necessarily to add new instruments to an existing dashboard, but instead, it is designed to reposition pre-existing instrument panels closer to the driver. Specifically, the invention functions to modify the shape or contour of the dashboard so that pre-existing instruments no longer extend straight across the length of the dashboard, but instead tend to wrap around the driver, thus emulating modern, modular wrap-around dashboards. How the invention accomplishes this, including how it is different over and above the devices described in the above patents, and the other prior art in general, will become clear upon consideration of the following description.

SUMMARY OF THE INVENTION

The invention disclosed here is designed to be used in connection with a conventional vehicle flat dashboard that normally has at least one, and usually two, instrument panels that are mounted in a frontal region of the dashboard, just to the right of the steering column. Each instrument panel normally holds conventional dashboard instruments, such as gauges, switches and the like. Further, each panel is conventionally mounted to the dashboard by screws or similar fasteners that are easily removable. Consequently, it is relatively easy to detach each panel from the dashboard as a single unit, while at the same time maintaining all instrument connections.

The invention is a housing that is adapted to be mounted to the same frontal region of the dashboard where the above-described instrument panels are normally located. In use, the instrument panels are first disconnected from the dashboard, and the housing is then mounted to the dashboard over the location where the panels were formerly positioned. The housing has first and second forwardly-positioned panel openings in its front one for each panel, in which the panels are remounted. Remounting the panels positions them closer to the driver.

The front or face of the housing is angled toward the driver as it extends along the dashboard away from the steering column and toward the right-hand side of the cab. In other words, an inwardmost edge of one of the panel openings, that which is nearest the steering column, is closer or spaced nearer the dashboard than an outwardmost edge of the second panel opening, the latter being positioned farthest from the steering column. This creates a wrap-around effect from the steering column toward the outer edge of the housing. Such effect may be enhanced by further angling the first panel opening relative to the second.

The invention as summarized above will become more fully understood upon consideration of the following detailed description which is to be read in conjunction with the drawings attached hereto.

BRIEF DESCRIPTION OF THE DRAWINGS

In the drawings, like reference numerals and numbers indicate like parts throughout the various views, unless specifically indicated otherwise, and wherein.

BEST MODE FOR CARRYING OUT THE INVENTION

Figure 1:
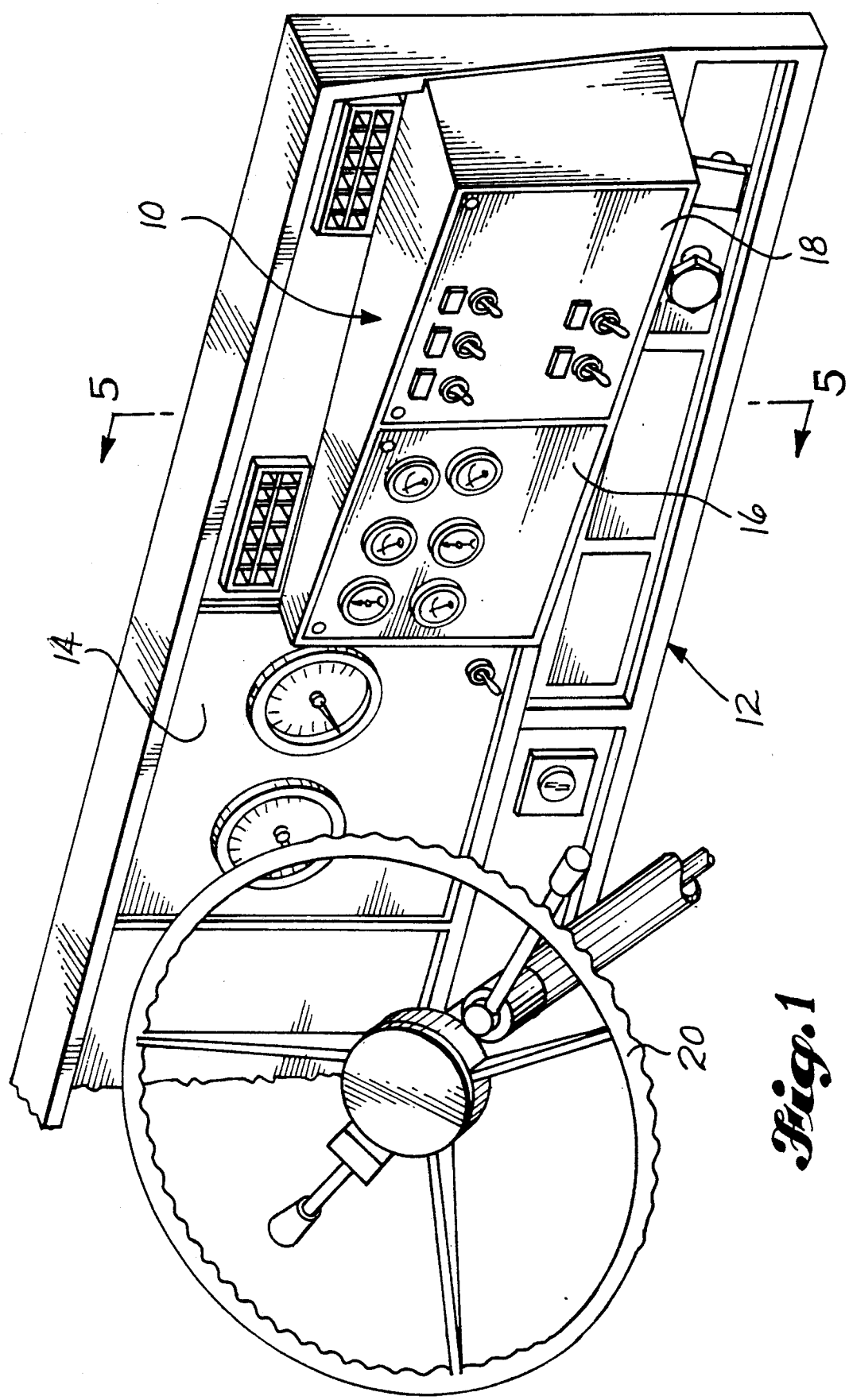
FIG. 1 is a pictorial view of a portion of a vehicle dashboard, and shows an add-on housing or dashboard accessory, in accordance with the invention, mounted to the front thereof.

Referring now to the drawings, and first to FIG. 1, shown generally at 10 is an add-on housing in accordance with a preferred embodiment of the invention. The housing 10 is shown mounted to a conventional truck dashboard, which is indicated generally at 12.

Figure 2:
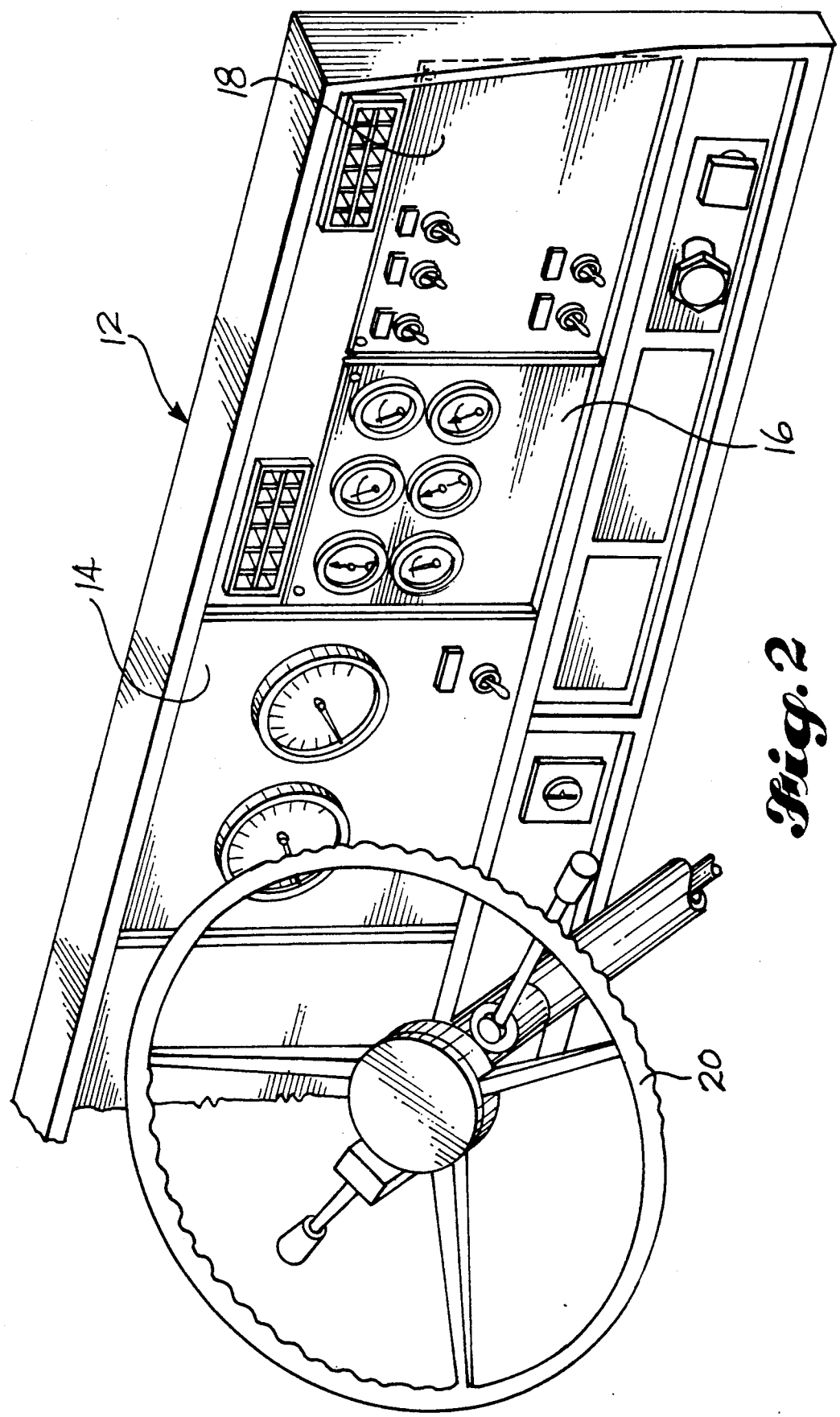
FIG. 2 is a pictorial view like FIG. 1, but shows the dashboard in a stock flat configuration, prior to mounting thereon the add-on housing shown in FIG. 1.

Referring to FIG. 2, the dashboard 12 is shown there prior to its modification by the addition of the housing 10. The skilled person would be familiar with the general layout of such a dashboard 12, as all gauges and switches conform to Regulated Common Carrier (R.C.C.) dash layout, including the arrangement of its various instrumentation panels 14, 16, 18.

Figure 3:
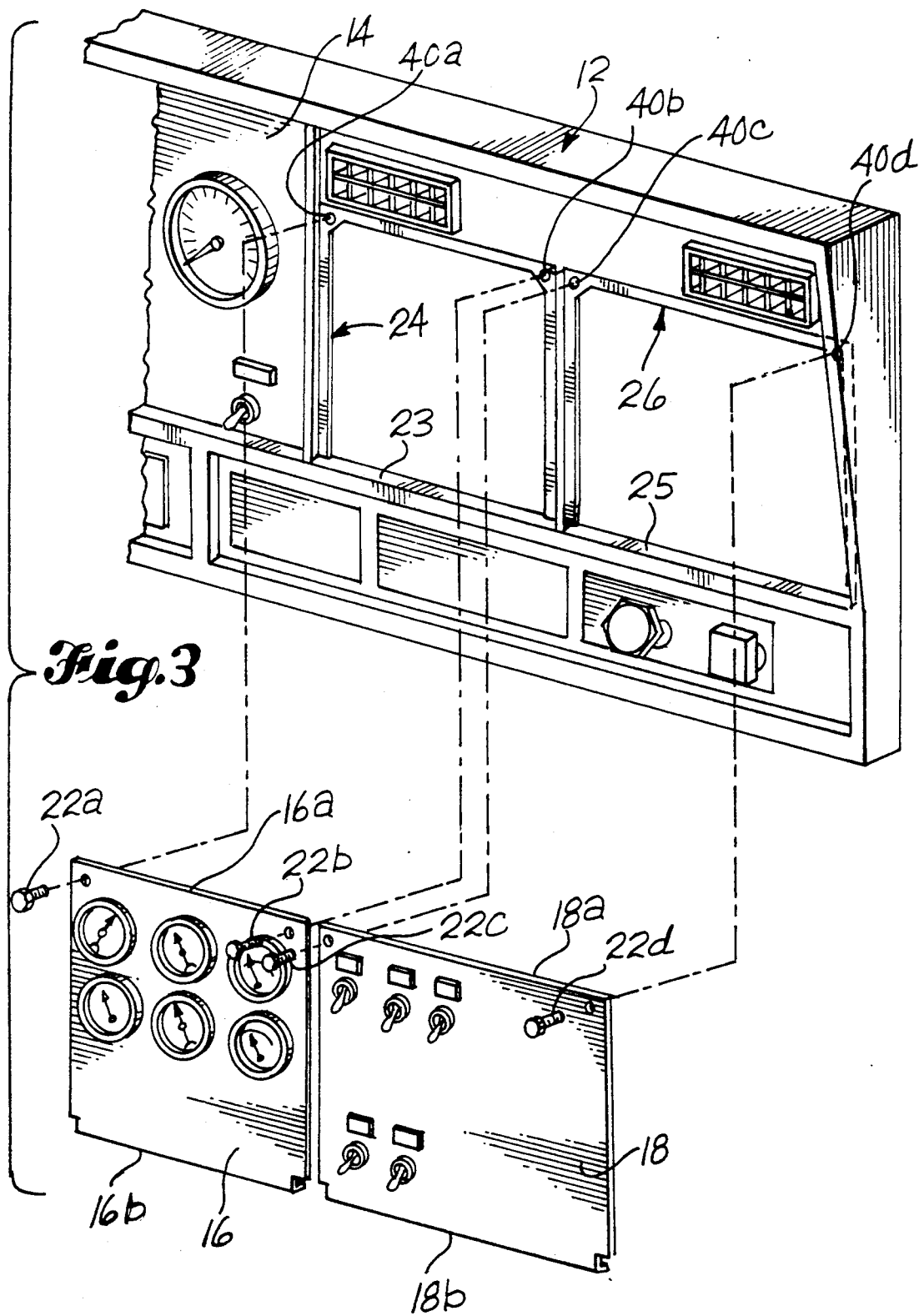
FIG. 3 is an exploded pictorial view similar to FIGS. 1 and 2, but shows a frontal region in the right-hand portion of the dashboard, and illustrates how instrument panels are detachably mounted to such region.
Figure 4:
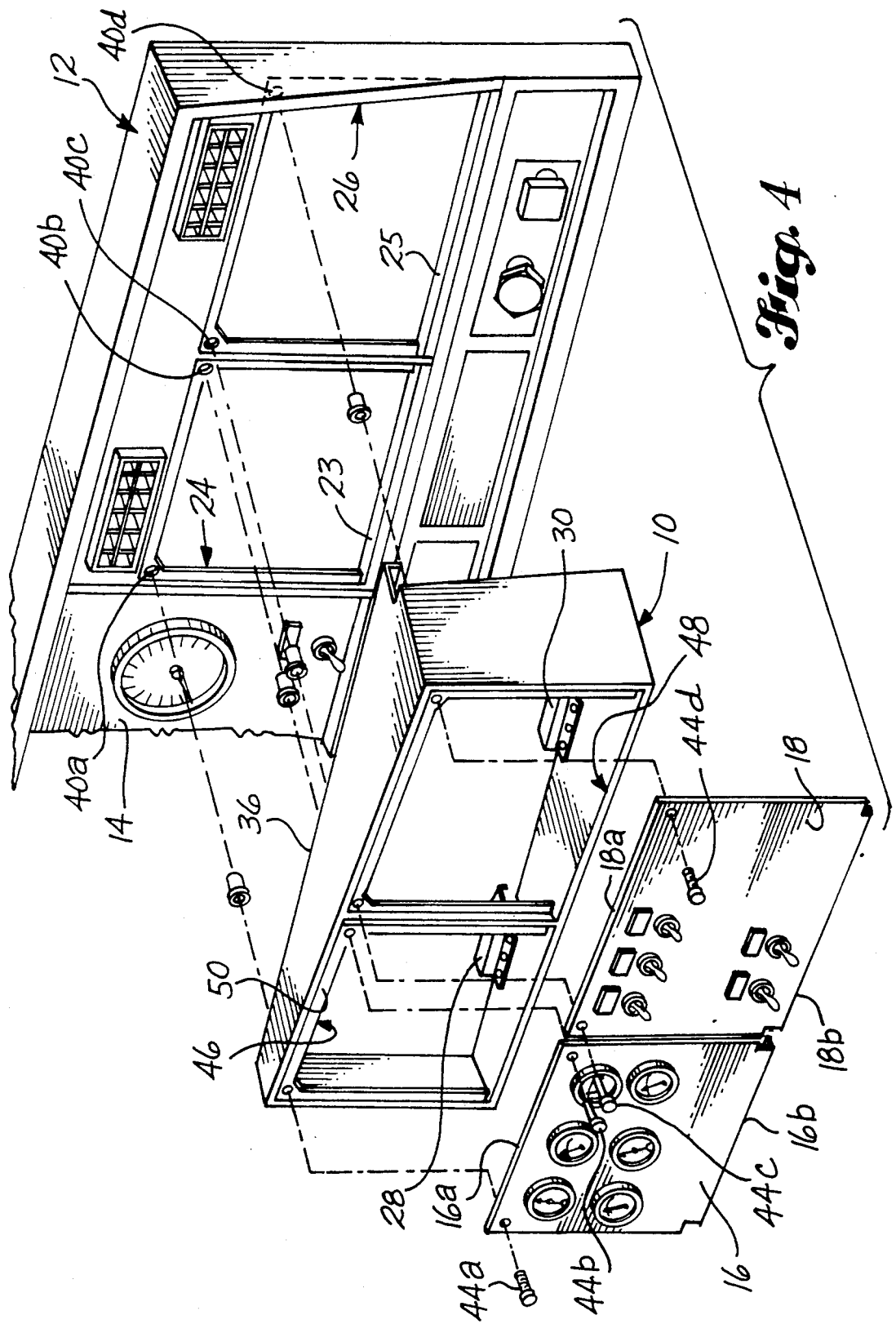
FIG. 4 is an exploded view similar to FIG. 3, but shows how the add-on housing shown in FIG. 1 is mounted to the frontal region of the dashboard after detachment of the instrument panels, and how the instrument panels are thereafter remounted to the forward face of the add-on housing.

As is apparent from FIGS. 3 and 4, the add-on housing 10 is intended to move two of the instrument panels 16, 18 closer to the driver, i.e. those two which are located on the dashboard to the right of steering wheel 20. This is accomplished by first detaching instrument panels 16, 18 from the dashboard 12, with their respective instruments connected thereto, i.e. gauges and switches. The instrument panels 16, 18 are detachably mounted to the dashboard by screws 22a–22d. These screws 22a–22d connect panel upper edges 16a, 18a to the dashboard after their lower edges 16b, 18b have been inserted behind retainers 23, 25 positioned at the bottom of each dashboard opening 24, 26.

After removal of instruments panels 16, 18 in the manner shown in FIG. 3, the add-on housing 10 is connected to the dashboard 12. As is apparent, it is sized and shaped so that it covers the same frontal region on the dashboard 12 that is normally taken up by instrument panels 16, 18 in the stock configuration. For the sake of understanding certain terminology as used here, "stock configuration" means as supplied by the manufacturer.

Figure 5:
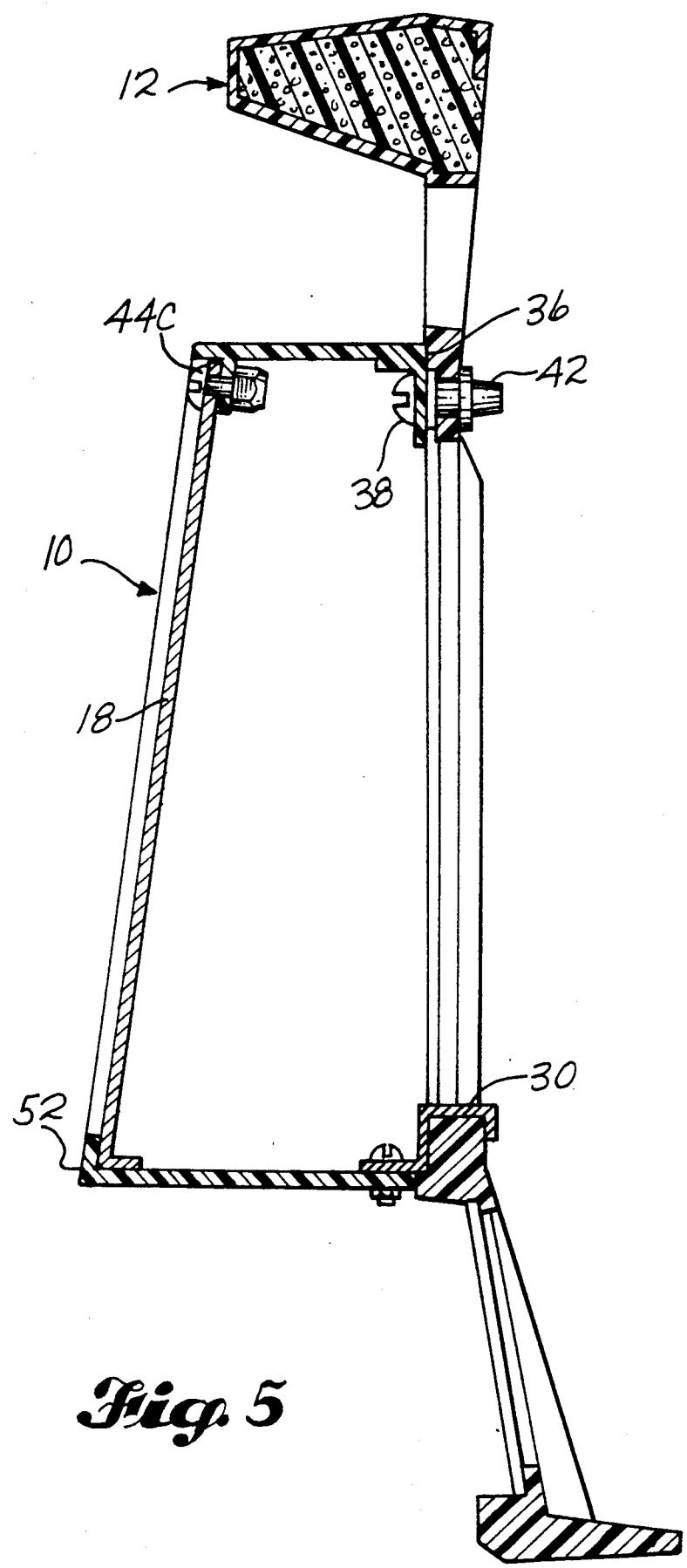
FIG. 5 is a side cross-sectional view of the add-on housing shown in FIGS. 1 and 4, taken along line 5—5 in FIG. 1, and shows how it is connected to the dashboard.
Figure 6:
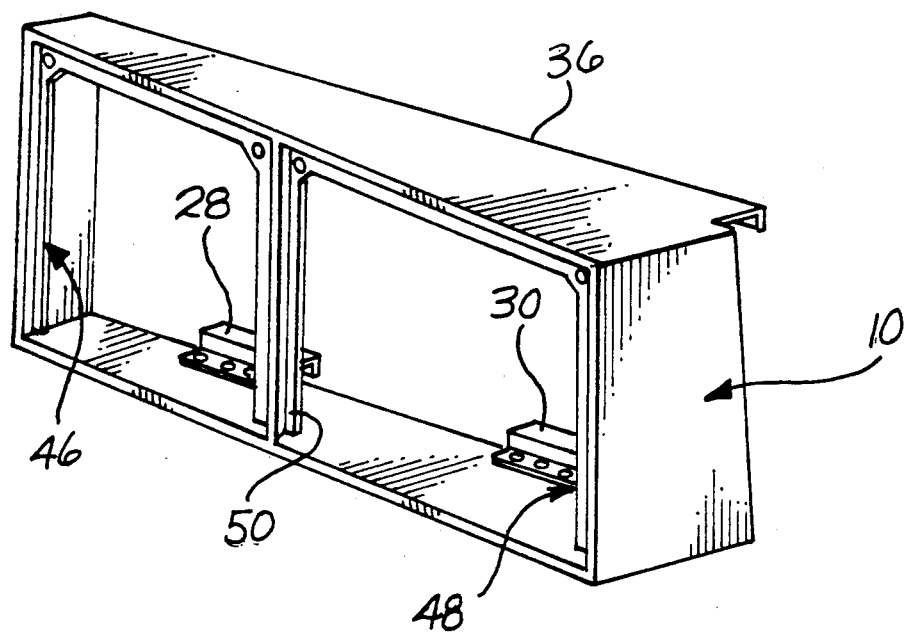
FIG. 6 is a pictorial view of the add-on housing shown in FIGS. 1, 4 and 5.

The add-on housing 10 is mounted to the dashboard by a pair of lower hooks 28, 30, which hook over the lower retainers 23, 25 of panel openings 24, 26. The upper edge 36 of the housing 10 is connected to the dashboard by conventional screws 38a–38d (see FIG. 5). These extend through the existing holes 40a–40d in the dashboard, and are threaded into conventional riv-nut fasteners.

After the add-on housing 10 is mounted to the dashboard 12, the instrument panels 16, 18 are re-attached to the front face of the housing by screws 44a–44d. This mode of attachment is similar to the way the instrument panels 16, 18 were originally attached to the dashboard 12, prior to its modification.

Figure 7:
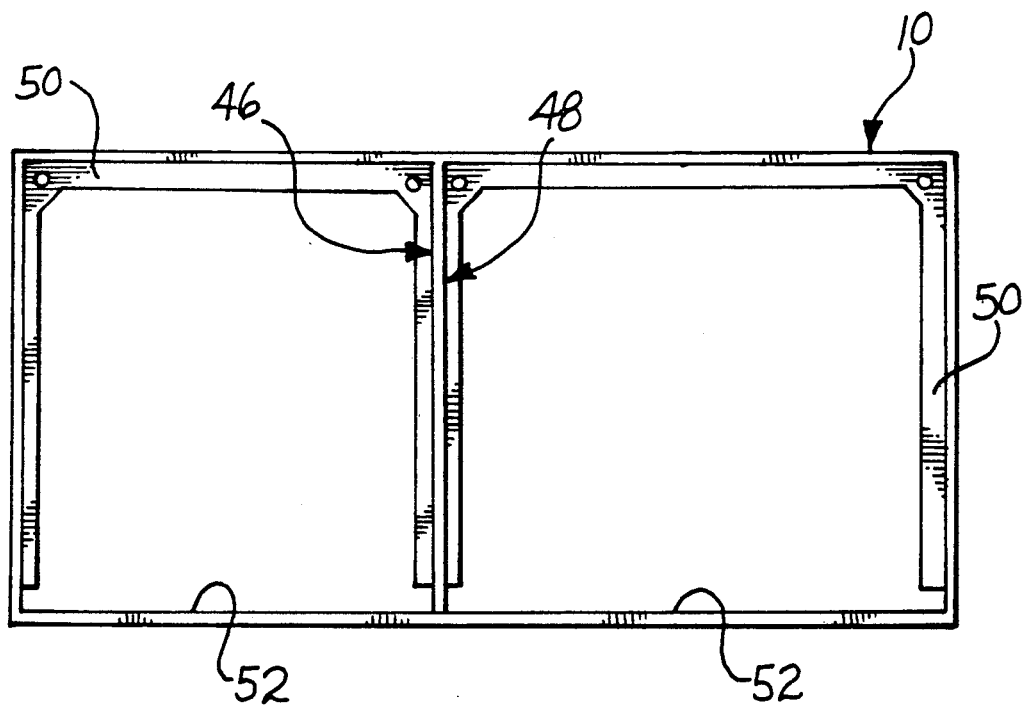
FIG. 7 is a frontal view of the add-on housing shown in FIG. 6.

Referring now to FIGS. 6–9, and to FIG. 7 in particular, the front face 46 of the housing has two panel openings, one indicated generally at 46, and the other indicated generally at 48. Both of these panel openings 46, 48 are spaced forwardly of the dashboard 12, as a result of the housing 10 projecting forwardly of the dashboard after it has been mounted thereto.

Preferably, each panel opening, 46, 48 in the housing 10 is the same size as the original panel-mounting opening 24, 26 in the stock dashboard. That is, each is sized and shaped to receive its respective instrument panel 16, 18, and to forwardly space each panel from its original position in the dashboard 12.

Each panel opening 46, 48 has a lip 50 that extends around three quarters of its circumference. The instrument panels 16, 18 respectively rest upon such lip when they are re-attached. The lower edge 52 of each panel opening is raised slightly, so as to define a retainer that captures the lower edges 16b, 18b of the instrument panels.

Figure 8:
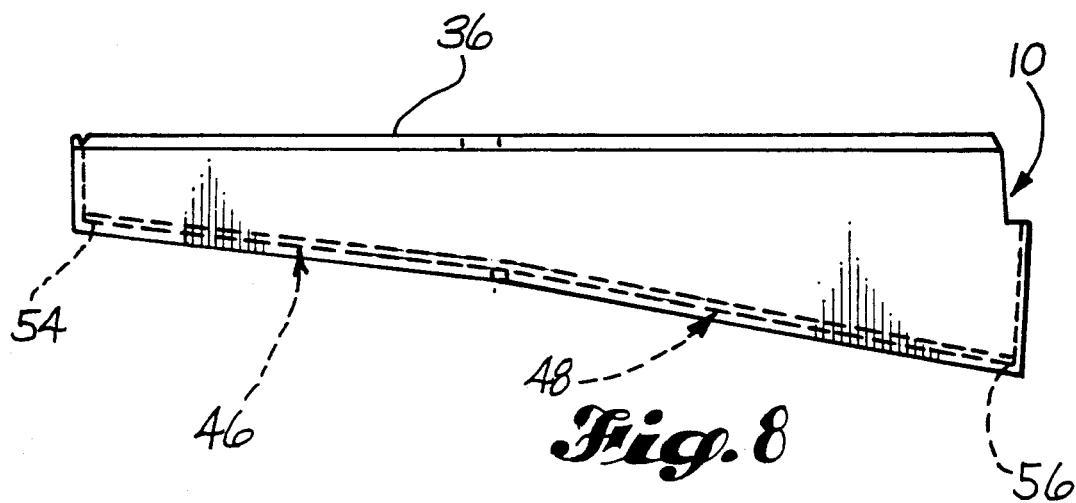
FIG. 8 is a top plan view of the add-on housing shown in FIGS. 6 and 7.
Figure 9:
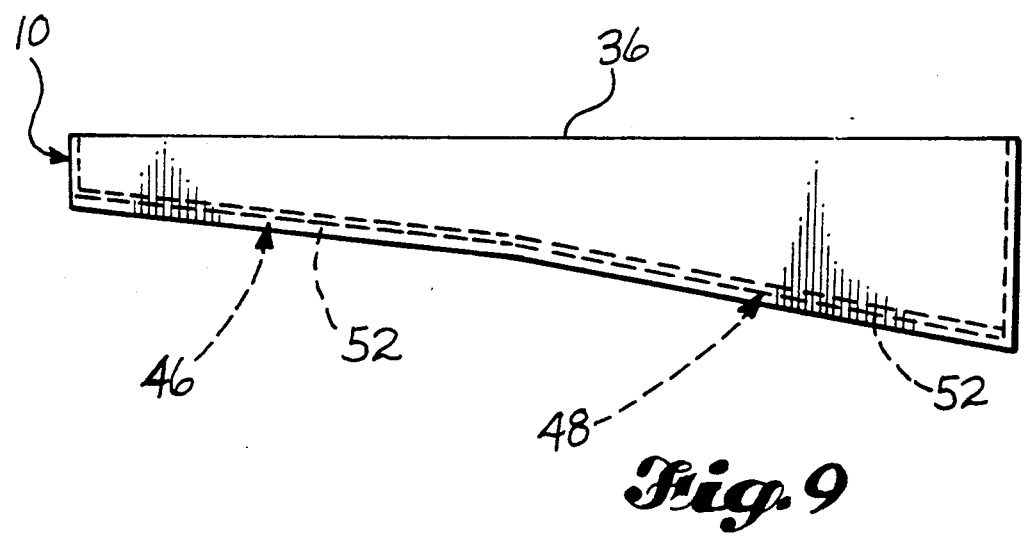
FIG. 9 is a bottom plan view of the add-on housing shown in FIGS. 6–8.

As is best seen in FIG. 8, the front face of the housing 10 is angled toward the driver as it extends from the inwardmost edge 54 of the first panel opening 46 to the outwardmost edge 56 of the second panel opening 48. This causes the add-on housing 10 to emulate wrap-around dashboards, bringing the instrument panels 16, 18 closer to the driver as they extend from the steering wheel 20 toward the right-hand side of the cab. As is further apparent from FIGS. 8 and 9, the first panel opening 46 is angled very slightly with respect to the second panel opening 48. This enhances the wrap-around effect.

The add-on housing 10 is designed to be used in connection with Kenworth (trademark) trucks, and to modify the stock dashboard configuration of older Kenworth trucks As such, it is anticipated that it will be used in identical form to what is shown in the drawings. However, the same concept may be employed in connection with other kinds of dashboards, and it is conceivable that a similar kind of add-on housing could be used to reposition a single instrument panel closer to the driver, instead of the two instrument panels described above. Naturally, this would depend on the stock configuration of the dashboard as it is produced by the truck manufacturer.

Consequently, the preceding description should not be taken in the limiting sense. What is intended to be the invention patented here is to be defined instead, by the subjoined patent claim or claims, the interpretation of which is to be made in accordance with the well-established doctrines of patent claim interpretation.

What is claimed is:

1. For use in connection with a pre-existing dashboard in a semi-tractor cab, said dashboard being of a stock configuration that extends substantially straight across said cab, with a steering column projecting from said dashboard into said cab, said dashboard having at least one pre-existing instrument panel normally mounted to a portion of a frontal region of said dashboard adjacent one side of said steering column, and wherein said instrument panel carries a plurality of dashboard instruments, and further, said instrument panel and said instruments being detachable and movable as a unit forwardly from said frontal region into said cab without making an electrical disconnections of said instruments, and add-on dashboard accessory for remounting and repositioning said instrument panel closer to the location where a driver of said semi-tractor normally sits, for providing said driver with between access to said instruments, said dashboard accessory comprising:

a hollow housing that is mountable to said frontal region of said dashboard, said housing being sized and shaped in a manner such that, when said housing is mounted to said frontal region, said housing covers substantially only the portion of said frontal region where said instrument panel was normally mounted thereto, and when so mounted, said housing projecting from said dashboard, and further, said housing having at least one panel opening in a frontal face area of said housing, said panel opening being sized and shaped for remounting said instrument panel therein, to thereby simultaneously reposition said instrument panel and said instruments carried thereby closer to said vehicle driver, and in use, said instrument panel and said instruments are first detached as a unit from said frontal region of said dashboard, and said housing is thereafter mounted to said frontal region, followed by mounting said instrument panel and said instruments as a unit to said panel opening in said frontal face area of said housing, to thereby reposition said instrument panel closer to said vehicle driver.

2. The dashboard accessory of claim 1, wherein said dashboard normally has two separate but side-by-side instrument panels mounted to a portion of said frontal region of said dashboard, said panels each carrying their own instruments, and each panel being forwardly detachable from said frontal region as a unit along with its instruments, and wherein said dashboard accessory further includes:

first and second panel openings in said housing, one panel opening for each of said instrument panels, and wherein said housing is placed into use by first detaching each of said instrument panels from said frontal region without making any electrical disconnections of said instruments, and thereafter mounting said housing to said frontal region, said housing being sized and shaped to over substantially only the portion of said frontal region where said instrument panels were detached from said frontal region, followed by mounting said instrument panels to said first and second panel openings, one of said panels being mounted in said first panel opening, and the other panel being mounted in said second panel opening, and still further, said first and second panel openings being angularly oriented relative to said dashboard, in a manner so that an inwardmost edge of said first panel opening is closer to said frontal region of said dashboard than an outwardmost edge of said second panel opening.

3. The dashboard accessory of claim 1, wherein said frontal region of said dashboard further includes fastener openings for mounting said instrument panel to said frontal region, and wherein said housing is mounted to said frontal region of said dashboard after said instrument panel has been detached from said dashboard by using at least some of said same fastener openings.

4. The dashboard accessory of claim 2, wherein said frontal region of said dashboard further includes fastener openings for mounting said instrument panels to said frontal region, and wherein said housing is mounted to said frontal region of said dashboard after said two instrument panels have been detached from said dashboard by using at least some of said same fastener holes.

5. The dashboard accessory of claim 2, wherein said first panel opening is oriented at an obtuse angle with respect to said second panel opening.

6. The dashboard accessory of claim 1, wherein said instrument panel is normally mounted across an opening in said frontal region of said dashboard, said opening having a peripheral border lip extending at least part way around the perimeter thereof, at least some of the edge of said panel resting upon said border lip when said panel is mounted to said dashboard, said housing further including an aft opening having at least one peripheral edge shaped to rest upon said border lip of said panel opening, and at least one hook connected to a base region of said aft opening, said hook engaging a lower edge of said panel opening when said housing is mounted to said frontal region, and fastener means for connecting said at least one peripheral edge to said border lip.

7. The dashboard accessory of claim 1, wherein said panel is substantially rectangularly-shaped and has fastener openings adjacent at least two corners thereof, and wherein said frontal face area of said housing has a peripheral lip upon which said panel rests when said panel is mounted to said frontal face area of said housing, said frontal face area having fastener openings that are positioned in a manner so as to be in registration with said fastener openings in said panel when said panel is mounted to said frontal face area.

8. A method for repositioning at least one existing vehicle instrument panel inside the cab of a vehicle, said instrument panel holding a plurality of dashboard instruments, said instrument panel being detachably mounted to a portion of a frontal region of a dashboard via a plurality of fasteners that extend through apertures in said panel and are engaged with matching fastener openings in said dashboard, said vehicle having a steering column, said frontal region being adjacent one side of said steering column, said method providing the reposition of said instrument panel and instruments as a single unit to a position forward of the dashboard, so that said instrument panel is positioned closer to the location where the vehicle driver normally sits, for providing said pier with between access to said instruments, said method comprising:

detaching said instrument panel and said instruments as a unit from said frontal region of said dashboard by removing said fasteners from engagement with said fastener openings;

mounting a hollow, add-on dashboard accessory housing to said frontal region of said dashboard, including using at least some of said fastener openings to connect said housing to said dashboard, said housing being sized and shaped such that said housing covers substantially only the portion of said frontal region where said instrument panel was mounted, said housing projecting from said dashboard in a direction generally into said vehicle cab; followed by pulling said instrument panel forwardly through said hollow housing, without electrically disconnecting said instruments, and remounting said panel in a panel opening across a frontal face region of said housing, to thereby reposition said panel and instruments as a unit closer to said vehicle driver.

9. The method of claim 8, wherein said instrument panel has a substantially rectangular perimeter, and a fastener aperture through said panel adjacent at least two corners of said panel, each fastener aperture providing a passageway through said panel to an underlying fastener opening when said panel is mounted to said dashboard, and wherein a single fastener extends through each fastener aperture and engages with said underlying fastener opening to attach said panel to said dashboard, the method including providing said panel opening across said frontal face region of said housing with a peripheral lip upon which said panel rests when said panel is remounted to said housing, said peripheral lip also having fastener openings which mate with and underlie said fastener apertures in said panel, for extending fasteners through said fastener apertures and into engagement with said underlying fastener openings, to thereby attach said panel to said housing.

* * * * *

UNITED STATES PATENT AND TRADEMARK OFFICE
CERTIFICATE OF CORRECTION

PATENT NO. : 5,174,621
DATED : December 29, 1992
INVENTOR(S) : John W. Anderson

It is certified that error appears in the above-identified patent and that said Letters Patent is hereby corrected as shown below:

Column 1, line 41, "or" should be -- on --.
Column 2, line 29, there is a comma after "front".
Column 4, line 33, there is a period after "trucks".
Claim 1, column 4, line 62, "an" should be -- any --;
    in line 63, "and" should be -- an --; and
    in line 66, "between" should be -- better --.
Claim 2, column 5, line 39, "over" should be -- cover --.
Claim 8, column 6, line 39, "reposition" should be
    -- repositioning --; and in line 43, "pier with between"
    should be -- driver with better --.

Signed and Sealed this

Nineteenth Day of April, 1994

*Attest:*

BRUCE LEHMAN

*Attesting Officer*    *Commissioner of Patents and Trademarks*